March 28, 1944.  C. DE GANAHL  2,345,531
HYDRAULIC ACTUATING MECHANISM
Filed June 18, 1942  2 Sheets-Sheet 2
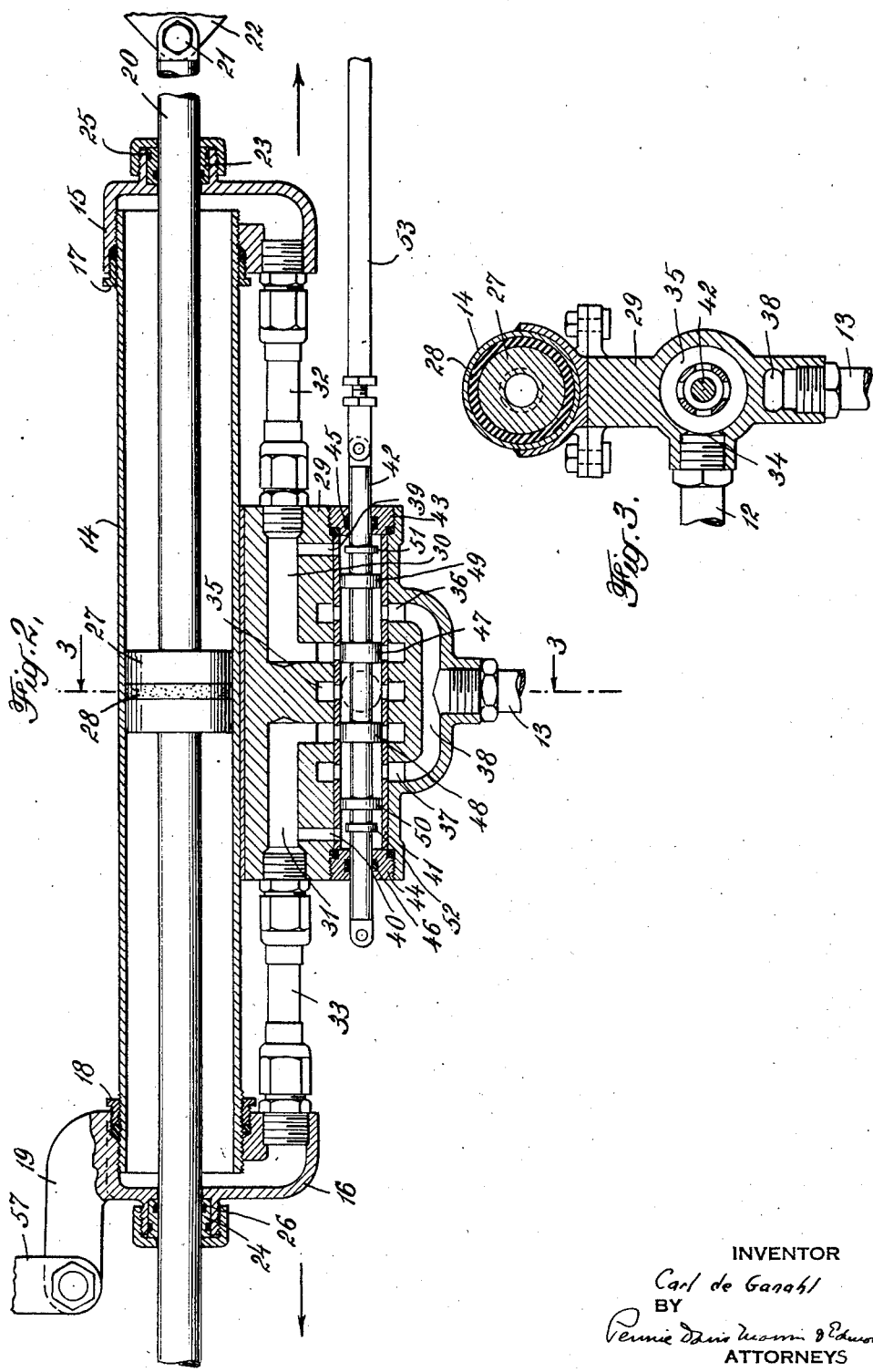
INVENTOR
Carl de Ganahl
BY
ATTORNEYS Patented Mar. 28, 1944

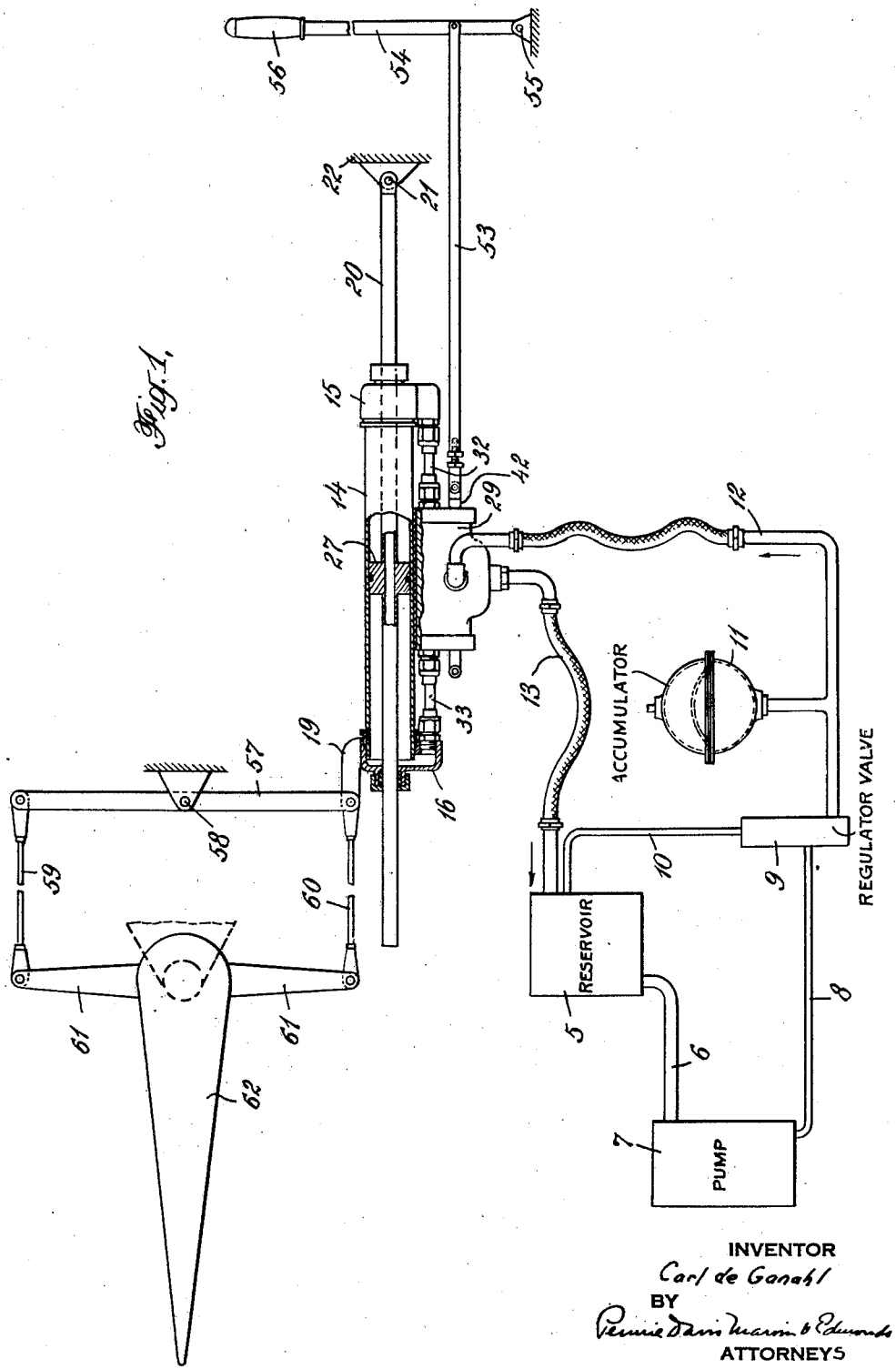

2,345,531

UNITED STATES PATENT OFFICE 2,345,531

HYDRAULIC ACTUATING MECHANISM

Carl de Ganahl, Trenton, N. J., assignor, by mesne assignments, to Reconstruction Finance Corporation Application June 18, 1942, Serial No. 447,502

4 Claims. (Cl. 121—41)

This invention relates to hydraulic actuating equipment for aircraft, and particularly to mechanism to facilitate the operation of control surfaces thereof.

In aircraft of the larger sizes, now in common use, the air resistance exerted on the various control surfaces which must be moved to guide the craft is relatively high. Consequently simple mechanical linkages do not permit the application of sufficient force by the operator, and auxiliary power devices are required. So called "servo mechanisms" have been designed for this purpose but require a multiplicity of complicated cable linkages to effect the desired result. The possibility of failure is increased with each cable and pulley employed in the assembly, and failure may mean disaster.

It is the object of the present invention to afford a simple and effective auxiliary mechanism to transmit power to the movable control surfaces of an aircraft.

Another object of the invention is the provision of a mechanism adapted to effect movement of the control surfaces through the "stick" or equivalent control device manipulated by the operator wherein a proportional part of the resistance of the control surface is felt by the operator, thus enabling him to control the aircraft by "feel."

Another object of the invention is the provision of means permitting manual operation of the control surfaces in the event of any failure of the power source without the necessity for any change in the mechanism.

Other objects and advantages of the invention will be apparent as it is better understood by reference to the following specification and the accompanying drawings, in which Fig. 1 is a diagrammatic illustration of the application of the mechanism to the control surface of an aircraft;

Fig. 2 is a longitudinal section through the hydraulic mechanism, and

Fig. 3 is a section on the line 3—3 of Fig. 2.

In carrying out the invention, I employ the conventional means for maintaining a supply of a suitable fluid under pressure. Any oil or other fluid which is not susceptible to marked changes with variations in temperature may be utilized. The fluid is stored in the reservoir 5 and is delivered by a pipe 6 to a pump 7 which may be driven from any source of power, as for example the engine employed to drive the aircraft. The fluid is delivered by the pump 7 through a pipe 8 to a pressure regulator valve 9 which bypasses the fluid through a pipe 10 to the reservoir 5 when fluid under the desired pressure has been accumulated in the accumulator 11. From the latter, the fluid passes through a pipe 12 to the mechanism hereinafter described. A return line 13 permits the fluid to flow to the reservoir 5 when it has served its purpose. It will be understood that the foregoing is a simplification of the system which may supply fluid under pressure to a multiplicity of hydraulically actuated mechanisms which form the subject of the present invention.

Referring to Figs. 2 and 3 of the drawings, a cylinder 14 is provided with heads 15 and 16 at opposite ends, the cylinder being sealed by means of glands 17 and 18 to prevent the escape of fluid therefrom. The head 16 is provided with a lug 19 adapted to be connected to the part to be actuated as hereinafter described. The cylinder is designated a "floating cylinder" because it is freely movable in longitudinal directions.

The cylinder is supported on a piston rod 20 which is secured at 21 to a fixed part 22 of the aircraft, so that the piston is immovable in its longitudinal direction. The piston rod extends through glands 23 and 24 provided with packing 25 and 26 to prevent the escape of fluid. A piston 27 is mounted on the piston rod 20 and is provided with packing 28.

A valve casing 29 is secured to the cylinder 14 and is movable therewith. It is provided with passages 30 and 31 connected by pipes 32 and 33 to the respective heads 15 and 16 and hence with the cylinder 14 on opposite sides of the piston 27. An inlet 34 is connected to the pipe 12, thus permitting fluid under pressure to enter a passage 35 in the valve casing. Similar passages 36 and 37 communicate with an outlet passage 38 which is connected to the pipe 13. Passages 39 and 40 communicate with the passages 30 and 31.

Within the valve casing, a sleeve 41 with a plurality of openings therein communicating with the passages described is adapted to receive a valve rod 42 extending through plugs 43 and 44 in the ends of the valve casing, having packing 45 and 46 to prevent the escape of fluid. The valve rod is provided with piston flanges 47 and 48 which close the openings to the passages 30 and 31 when the valve is centered. The mechanism is then inoperative. The valve rod is also provided with piston flanges 49 and 50 acting in the manner hereinafter described and piston flanges 51 and 52 adapted to permit operation of the mechanism should the fluid pressure fail. The valve rod 42 is connected by a link 53 to the stick 54 pivoted at 55 and having a handle 56, thus permitting manual shifting of the valve rod to effect the purpose of the invention.

The lug 19 is connected to a lever 57 secured at 58 to a fixed part of the aircraft. Links 59 and 60 connect the lever 57 to a lever 61 which actuates a typical control surface 62 of the aircraft. By means of the linkage described, the control surface may be raised or lowered, depending upon the movement of the cylinder 14.

In the operation of the device, when the valve rod 42 is moved to the left viewing Fig. 2, the flange 48 will uncover the port leading to the passage 31, permitting the pressure fluid to flow through the pipe 33 and into the cylinder 14 at at the left of the piston 27. This will cause the cylinder to move to the left, and the movement will be transmitted to raise the control surface 62, turning it about its pivot. As the cylinder 14 moves to the left under the influence of the pressure fluid, the valve casing will be carried with it, and if the valve rod is held stationary, the flange 48 will again cover the port leading to the passage 31. At this point the cylinder becomes stationary, and the control surface is held in the desired position. The desired movement of the control surface is effected by a corresponding movement of the stick 54 which in turn shifts the valve rod 42 to the desired position.

When the valve rod 42 has been shifted, as hereinbefore indicated, to uncover the port leading to the passage 31, the corresponding port leading to the passage 32 is simultaneously uncovered to permit the return flow of fluid at the right of the piston 27 through the pipe 32 and passage 30 and thence through the outlet passage 38 to the pipe 13. If the valve rod 42 is moved to the right, the pressure fluid will enter the passage 30 and pass to the cylinder 14 at the right of the piston, whereupon the cylinder will move to the right and a corresponding movement of the control surface 62 will be effected. During this operation, fluid in the cylinder at the left of the piston will escape through the passage 30 and into the outlet passage 38.

In order that the operator may feel the resistance due to the air pressure on the control surface 62, the flanges 49 and 50 are designed to act as pistons. The passages 39 and 40 permit the pressure of the fluid in the passages 30 and 31 to be transmitted to the flanges 49 and 50. Hence the tendency of the air pressure to reverse the movement of the cylinder 14 is transmitted to the valve rod 42 and through the link 53 to the stick 54. Since the area of the pistons 49 and 50 is relatively small compared to that of the piston 27, the force exerted by the fluid on the valve rod 42 is proportional to but very much less than the force maintained on the cylinder 14. Hence the operator may guide the ship by "feel" without exerting undue or tiresome force upon the stick 54. Whenever it is necessary for the operator to move one or more of the control surfaces 62, movement of the stick in the desired direction immediately brings into play the force of the pressure fluid to accomplish the desired movement without strain on the operator.

There is, of course, always the possibility of failure of the power source, and it is essential to provide the operator with means for controlling the aircraft independently of the power source. The flanges 51 and 52 are so arranged that by movement of the valve rod 42 a short distance in either direction, the flange 51 or 52 will be brought into engagement with the plug 43 or 44, affording an abutment. By such engagement, the valve casing 29 and the cylinder 14 can be forced to move in the desired direction, permitting direct manual operation of the control surface without any modification of the mechanism. When the valve rod 42 is thus moved in either direction to effect a mechanical movement of the cylinder 14, the outlet passage 38 is automatically connected through the respective passages 30 and 31 with the side of the cylinder through which fluid must escape in order to permit movement of the cylinder. The operator need not, therefore, effect manually any movement other than that of the stick 54 in order to change from hydraulic to direct mechanical operation of the mechanism.

In the operation of the device, the operator will move the stick 54 in proportion to the desired movement of the control surface 62. If he desires further movement of the control surface 62 in the same direction, the stick will be manipulated likewise in the same direction. By reversing the operation of the stick, the valve rod immediately opens the necessary ports to permit the cylinder to travel in the opposite direction and thus effect the desired movement of the control surface. When the stick is moved in any direction and held static, the cylinder moves a corresponding amount and becomes static until the stick is again moved to effect some different operation.

The mechanism is compact and practically self-contained. It may be disposed adjacent to the particular control surface which is to be actuated and connected with a minimum of linkage. Complicated cable connections such as have characterized devices intended for similar purposes are avoided through the application of the floating cylinder carrying the valve casing.

Various changes may be made in the details of the mechanism without departing from the invention or sacrificing the advantages thereof.

I claim:

1. A fluid pressure actuated power mechanism comprising a cylinder, a cylinder head closing each end of the cylinder, a piston rod extending through the cylinder and the cylinder heads at each end thereof, a piston on the piston rod within the cylinder, said cylinder being movable axially along the piston rod and the piston, means connecting the cylinder with a member to be actuated, a valve casing movable with the cylinder, a fluid inlet to said valve casing, a fluid discharge from the valve casing, fluid passages from opposite sides of the fluid inlet to the respective cylinder heads, a valve sleeve within the valve casing having ports communicating with the fluid inlet, with the passages to the cylinder heads and with the fluid discharge from the valve casing, the ports communicating with the fluid discharge being at the sides of the ports communicating with the passages to the cylinder heads opposite the port communicating with the fluid inlet, a valve rod reciprocable within the valve sleeve, means for reciprocating the valve rod, the valve rod having piston flanges thereon to control the flow of the fluid from the fluid inlet to the respective passages communicating with the cylinder heads and from those passages to the fluid discharge, so that the fluid may be introduced into the cylinder at either side of the piston to cause the cylinder to move relative thereto, a piston flange on the valve rod outwardly beyond each port in the valve sleeve communicating with the fluid discharge, passages connecting the respective spaces outwardly behind the last-mentioned piston flanges with the passages leading to the cylinder heads, whereby a proportional part of the resistance to movement of the cylinder is transmitted to the valve rod, and means on the valve rod, within the valve casing and outwardly beyond the last-mentioned piston flanges to engage the valve casing and to actuate it and the cylinder independently of the flow of fluid.

2. A fluid pressure actuated power mechanism comprising a cylinder, a cylinder head closing each end of the cylinder, a piston rod extending through the cylinder and the cylinder heads at each end thereof, a piston on the piston rod within the cylinder, said cylinder being movable axially along the piston rod and the piston, means connecting the cylinder with a member to be actuated, a valve casing movable with the cylinder, a fluid inlet to said valve casing, a fluid discharge from the valve casing, fluid passages from opposite sides of the fluid inlet to the respective cylinder heads, a valve sleeve within the valve casing having ports communicating with the fluid inlet, with the passages to the cylinder heads and with the fluid discharge from the valve casing, the ports communicating with the fluid discharge being at the sides of the ports communicating with the passages to the cylinder heads opposite the port communicating with the fluid inlet, a valve rod reciprocable within the valve sleeve, manually-operable means for reciprocating the valve rod, the valve rod having piston flanges thereon to control the flow of the fluid from the fluid inlet to the respective passages communicating with the cylinder heads and from those passages to the fluid discharge, so that the fluid may be introduced into the cylinder at either side of the piston to cause the cylinder to move relative thereto, a piston flange on the valve rod outwardly beyond each port in the valve sleeve communicating with the fluid discharge, and passages connecting the respective spaces outwardly behind the last-mentioned piston flanges with the passages leading to the cylinder heads, whereby a proportional part of the resistance to movement of the cylinder is transmitted to the valve rod, the valve rod normally being free to reciprocate within the valve sleeve in response to slight variations in the pressure in said respective spaces, so that relatively slight changes in the resistance to movement of the cylinder will be felt by one holding the means for reciprocating the valve rod.

3. A fluid pressure actuated power mechanism comprising a cylinder, a piston rod extending through each end of the cylinder and secured against movement, a piston on the piston rod within the cylinder, said cylinder being movable axially along the piston rod and the piston, means for connecting the cylinder with a member to be actuated, a valve casing, a fluid inlet to said valve casing, a fluid discharge from the valve casing, fluid passages from opposite sides of the fluid inlet to the cylinder at opposite sides of the piston, a valve sleeve within the valve casing having ports communicating with the fluid inlet, with the passages to the cylinder and with the fluid discharge from the valve casing, the ports communicating with the fluid discharge being at the sides of the ports communicating with the passages to the cylinder opposite the port communicating with the fluid inlet, a valve rod reciprocable within the valve sleeve, manually-operable means for reciprocating the valve rod, piston flanges on the valve rod to control the flow of fluid from the fluid inlet to the respective passages communicating with the cylinder and from those passages to the fluid discharge, so that the fluid may be introduced into the cylinder at either side of the piston to cause the cylinder to move relative thereto, a piston flange on the valve rod outwardly beyond each port in the valve sleeve communicating with the fluid discharge, and passages connecting the respective spaces outwardly behind the last-mentioned piston flanges with the passages leading to the cylinder, whereby a proportional part of the resistance to movement of the cylinder is transmitted to the valve rod, the valve rod normally being free to reciprocate within the valve sleeve in response to slight variations in the pressure in said respective spaces, so that relatively slight changes in the resistance to movement of the cylinder will be felt by one holding the means for reciprocating the valve rod.

4. A fluid pressure actuated power mechanism comprising a cylinder, a piston rod extending through each end of the cylinder and secured against movement, a piston on the piston rod within the cylinder, said cylinder being movable axially along the piston rod and the piston, means for connecting the cylinder with a member to be actuated, a valve casing having a cylindrical bore, a fluid inlet to the valve casing, a fluid discharge from the valve casing, fluid passages from the valve casing to the cylinder at opposite sides of the piston, passages in the valve casing connecting the bore to the fluid inlet, to the fluid discharge and to the passages leading to the cylinder, the passages connecting the bore to the passages leading to the cylinder being intermediate the passages connecting the bore to the fluid inlet and to the fluid discharge, a valve rod reciprocable within said bore, manually-operable means for reciprocating the valve rod in said bore, piston flanges on the valve rod to control the flow of fluid from the fluid inlet to the respective passages communicating with the cylinder and from those passages to the fluid discharge, so that the fluid may be introduced into the cylinder at either side of the piston to cause the cylinder to move relative thereto, a piston flange on the valve rod outwardly beyond each passage connecting said bore with the fluid discharge, and passages connecting the respective spaces outwardly behind the last-mentioned piston flanges to the cylinder at opposite sides of the piston, whereby a proportional part of the resistance to movement of the cylinder is transmitted to the valve rod, the valve rod normally being free to reciprocate within the bore of the valve casing in response to slight variations in the pressure in said respective spaces so that relatively slight changes in resistance to movement of the cylinder will be felt by one holding the means for reciprocating the valve rod.

CARL DE GANAHL.